Patented Jan. 25, 1927.

1,615,646

UNITED STATES PATENT OFFICE.

WALTHER PENECKE, OF GRAZ, AUSTRIA, ASSIGNOR TO FELICE BEUSA, OF GENOA, ITALY.

PROCESS OF MANUFACTURING DYES.

No Drawing. Application filed April 7, 1925, Serial No. 21,435, and in Austria April 10, 1924.

It has been found that by treating perylene or its derivatives with compounds of sulphur and phosphorus at higher temperatures valuable dyes are obtained which dye wool and cotton in beautiful colours. By oxidizing these substances products resembling sulpho acids may be obtained while by sulphuretting sulphur dyes are obtained.

The following is a description of examples of carrying into practice the above process.

Example I.

1 part by weight of perylene, 1 part by weight of kieselguhr and 2 parts by weight of pentasulphide of phosphorus are heated during about an hour to a temperature of 230° centigrade. The resulting mass is finely triturated and boiled first with water and then with dilute hydrochloric acid and subsequently filtered. The dye thus obtained is dissolved in an alkaline solution and separated by filtering from the kieselguhr and from residual sulphur if present, and finally precipitated by concentrated hydrochloric acid. The product is almost insoluble in organic solvents, in hot sulphuric acid it dissolves with a cardinal red colour, in alkalies with a fiery red colour. It dyes wool from a suspension in acetic acid and cotton from a solution in alkali in a fiery red colour.

If instead of pentasulphide of phosphorus trisulphide of phosphorus is used a similarly dyeing product is obtained.

If the product obtained by means of pentasulphide of phosphorus is oxidized in a solution in alkali by means of peroxide of hydrogen, then after precipitating by sulphuric acid a brownish red precipitate is obtained which dissolves in concentrated sulphuric acid with a violet red colour and in an alkali solution with a brown colour. The suspension of this substance in acetic acid dyes wool an orange colour. The oxidation may also take place on the fibre.

On melting, however, the dye obtained by means of pentasulphide of phosphorus with 2 parts by weight of sodium sulphide and 3 parts by weight of sulphur at 300° centigrade for about 20 minutes a sulphur containing dye is obtained which is soluble in hot concentrated sulphuric acid with a violet colour; its green solution in sodium sulphide solution dyes cotton in a moss green colour resistant to light.

Example II.

1 part by weight of dibenzoyl perylene (Berichte der deutschen Chemischen Gesellschaft vol. 43 page 2208) is treated with one part by weight of zinc sulphide and 3 parts by weight of pentasulphide of phosphorus in the same way as described in Example I except that the duration of the reaction is 30 minutes. The product thus obtained is soluble in hot concentrated sulphuric acid with a bluish green colour and in an alkali with a blue colour. It dyes wool and cotton in a blue colour resistant to light.

By continuing the reaction for 90 minutes, a product is obtained which is soluble in hot concentrated sulphuric acid with a blue colour and in an alkali solution with a bluish green colour and dyes wool and cotton in bluish green colours resistant to light.

Example III.

When perylene 3.10 quinone or tetrachloride of perylene is treated in accordance with Example I products are obtained which dye in similar fiery red colours as the dye obtained from perylene and pentasulphide of phosphorus.

What is claimed is:

1. A process for manufacturing dyes consisting in heating perylene derivatives together with sulphides of phosphorus.

2. A process for manufacturing dyes consisting in heating perylene derivatives together with sulphides of phosphorus in the presence of inert substances.

3. A process for manufacturing dyes consisting in heating perylene derivatives together with sulphides of phosphorus in the presence of kieselguhr.

4. A process for manufacturing dyes consisting in heating perylene derivatives together with sulphides of phosphorus difficultly fusible metal sulphides being added to the mass.

5. A process for manufacturing dyes consisting in heating perylene derivatives together with sulphides of phosphorus in the present of inert substances, difficultly fusible metal sulphides being added to the mass.

6. A process for manufacturing dyes consisting in heating perylene derivatives together with sulphides of phosphorus in the presence of kieselguhr, difficultly fusible metal sulphides being added to the mass.

7. A process for manufacturing dyes consisting in heating dibenzoyl perylene together with sulphides of phosphorus.

8. A process for manufacturing dyes consisting in heating dibenzoyl perylene with pentasulphide of phosphorus in the presence of sulphide of zinc.

In testimony whereof I have affixed my signature.

WALTHER PENECKE.

6. A process for manufacturing dyes consisting in heating perylene derivatives together with sulphides of phosphorus in the presence of kieselguhr, difficultly fusible metal sulphides being added to the mass.

7. A process for manufacturing dyes consisting in heating dibenzoyl perylene together with sulphides of phosphorus.

8. A process for manufacturing dyes consisting in heating dibenzoyl perylene with pentasulphide of phosphorus in the presence of sulphide of zinc.

In testimony whereof I have affixed my signature.

WALTHER PENECKE.

CERTIFICATE OF CORRECTION.

Patent No. 1,615,646.     Granted January 25, 1927, to

WALTHER PENECKE.

It is hereby certified that the name of the assignee in the above numbered patent was erroneously written and printed as "Felice Beusa", whereas said name should have been written and printed as "Felice Bensa" as shown by the records of assignments in this office; and that the said Letters Patent should be read with this correction therein that the same may conform to the record of the case in the Patent Office.

Signed and sealed this 29th day of March, A. D. 1927.

Seal.

M. J. Moore,
Acting Commissioner of Patents.

CERTIFICATE OF CORRECTION.

Patent No. 1,615,646. Granted January 25, 1927, to

WALTHER PENECKE.

It is hereby certified that the name of the assignee in the above numbered patent was erroneously written and printed as "Felice Beusa", whereas said name should have been written and printed as "Felice Bensa" as shown by the records of assignments in this office; and that the said Letters Patent should be read with this correction therein that the same may conform to the record of the case in the Patent Office.

Signed and sealed this 29th day of March, A. D. 1927.

M. J. Moore,
Acting Commissioner of Patents.

Seal.